United States Patent [19]

Ju

[11] Patent Number: 4,737,065
[45] Date of Patent: Apr. 12, 1988

[54] TRUCK

[76] Inventor: Jing C. Ju, No. 781, Chien Cheng road, Taichung City, Taiwan

[21] Appl. No.: 890,902

[22] Filed: Jul. 28, 1986

[51] Int. Cl.⁴ .............................................. B65G 7/00
[52] U.S. Cl. .................................. 414/490; 254/4 R; 280/47.24
[58] Field of Search ...................... 414/490, 495, 506; 280/47.24, 47.28; 254/4 R, 4 B, 4 C

[56] References Cited

U.S. PATENT DOCUMENTS

| | | | |
|---|---|---|---|
| 2,516,260 | 7/1950 | Schildmeier | 414/427 |
| 2,777,667 | 1/1957 | Stafford et al. | 254/4 R |
| 2,827,190 | 3/1958 | Spitzmesser | 280/47.24 X |
| 3,313,521 | 4/1967 | Sauka | 254/4 B |
| 3,861,647 | 1/1975 | Meredith | 254/4 R |
| 4,435,115 | 3/1984 | Orstad et al. | 414/490 |
| 4,632,627 | 12/1986 | Swallows | 414/490 |

FOREIGN PATENT DOCUMENTS 237527 4/1964 Austria ............................... 414/490

Primary Examiner—Peter A. Aschenbrenner
Attorney, Agent, or Firm—Kirschstein, Kirschstein, Ottinger & Israel

[57] ABSTRACT

A hand-operated truck comprises a frame having a base and an upstanding portion which includes two main wheels at its bottom side, a hand-operated lift assembly above the wheels and a top handle portion. An auxiliary wheel is mounted on the upstanding portion above the main wheel and can be grounded to cooperate with the main wheels to support a load when the upstanding portion is inclined. The lift assembly includes a reel and a rope for lowering and raising the load, and a brake assembly for controlling the lowering and lifting operation.

14 Claims, 9 Drawing Sheets

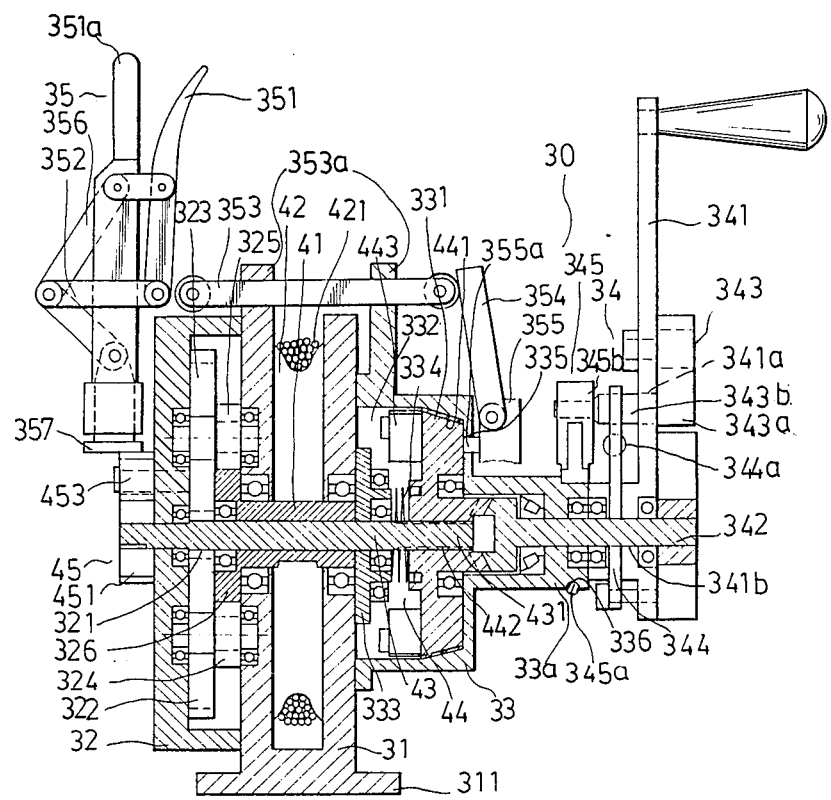
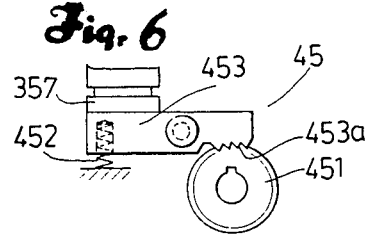
Fig. 6
Fig. 7

4,737,065

TRUCK

BACKGROUND OF THE INVENTION

This invention relates to a truck, particularly to a hand-operated truck which has an upstanding frame portion connected to a base and two bottom wheels cooperating with an auxiliary wheel to support the truck in an inclined position. A lift means is mounted on the upstanding frame to lift and lower a movable load support so as to facilitate loading or unloading.

Various trucks have existed in the art. The simplest truck, called a barrow is shown in FIG. 1, having an elongate upstanding handle 11 connected to a load support base 12 with two wheels 13 attached at the rear bottom side thereof. In common practice, when carrying luggage or other heavy loads 10 with this barrow, the upstanding handle is inclined to a most convenient position in which a user feels that the weight of the load is the smallest. This position is achieved when the center of the gravity of the load is on the same vertical line as the axis of the wheels. However, it is difficult to maintain the barrow in that position all the time the barrow is in operation because of reasons such as unevenness and turns in the paths on which the barrow moves. If the center of gravity of the load deviates from the ideal position, the user has to use a greater effort to move the barrow. Moreover, the barrow is inconvenient for loading and unloading operations from a higher place to a lower place or vice versa.

SUMMARY OF THE INVENTION

An object of the invention is to provide an improved hand-operated truck which is more convenient than the conventional trucks for carrying loads, especially loading or unloading at either a higher place or a lower place.

Another object of the invention is to provide a hand-operated truck by which one can carry a load without using much force.

The invention provides a frame having a base and an upstanding portion extending from a rear end of the base, the upstanding portion having two main wheels at its bottom side, a lift means support rearwardly extending above the main wheels, an auxiliary wheel which is attached to the lower side of the lift means support and which is vertically and horizontally offset from an axis of the wheels when the base lies horizontally, a handle portion at the upper portion of the upstanding portion, and vertical rail bars extending from the rear side of the base to the handle portion.

There is a load support movable upward and downward provided on the base and having an upstanding portion which extends adjacent to the rail bars and which has rail rollers engaging with the rail bars. A lift means is mounted on the lift means support, the lift means including a reel, a rope wound on the reel and connected to the load support, and an operating means for rotating the reel. A pulley means is mounted at the top side of the upstanding portion of the frame, over which the rope is passed.

In one aspect of the invention, the truck further include a reel casing mounted on the lift means support for encasing the reel. The casing has at its central portion a shaft sleeve mounted movably therein and a drive shaft inserted movably in the shaft sleeve, the drive shaft having two end portions extending outward from two ends of the shaft sleeve, and the reel being mounted on the shaft sleeve.

In another aspect of the invention, the lift means further include a transmission means casing mounted adjacent to one side of the reel casing, the transmission means including a set of meshing gears for transmitting the rotation of the driven shaft to the shaft sleeve with a reducing speed, one of the gears being fixed on the drive shaft and another one of the gears being fixed to the shaft sleeve.

In still another aspect of the invention, the operating means includes a driving shaft aligned coaxially with the driven shaft and having a first toothed clutch end adjacent to the driven shaft, and a hand crank plate attached to the driving shaft adjacent to the end of the driving shaft opposite to the driven shaft.

In still another aspect of the invention, the lift means further includes a brake means which comprises: a brake casing mounted adjacent to the other side of the reel casing opposite to the transmission means casing; a clutch disc mounted in an axially movable position on the driven shaft adjacent to the first toothed clutch end and having a second toothed clutch end axially projecting from the central portion of the clutch disc for engaging with the first toothed clutch end; a spring member attached to the driven shaft and biasing the clutch disc to cause the second toothed clutch end to engage with the first toothed clutch end; and a second operating means for disengaging the second toothed clutch end from the first toothed clutched end. The firsts and second toothed clutch ends have respectively axially extending clutch teeth of triangular cross-section.

In still another aspect of the invention, the brake casing has an inner conical friction surface, and the clutch disc further includes a bevel lining to contact with the inner surface of the brake casing. Two brake shoes are connected movably to the clutch disc to engage with the inner surface of the brake casing by centrifugal force.

In still another aspect of the invention, the brake means further includes a toothed catch wheel mounted on the end of the driven shaft adjacent to the transmission means casing, a catch lever fulcrumed at the transmission casing adjacent to the toothed catch wheel, and a resilient means biasing the catch lever to engage with the toothed catch wheel, said catch lever disengaging from said catch wheel by the operation of said second operating means. The second operating means includes a lever handle and a crank mechanism connected to said catch lever and the clutch disc.

In still another aspect of the invention, the operating means further has a vane wheel affixed to the end of the driving shaft opposite to the first toothed clutch end. The hand crank plate is movable relative to the driving shaft and includes a driving plate attached thereto for engaging and driving the vane wheel when the hand crank is operated. With this arrangement, the hand crank plate will not rotate when the driven shaft is rotated upon descending of the load due to the weight of the load, but can cause the driven shaft to rotate upon operation of the hand crank plate.

The present exemplary preferred embodiment will be described in detail with reference to the accompanying drawings, in which:

BRIEF DESCRIPTION OF THE DRAWINGS

FIG. 6 is a sectional view of a lift means of the truck;

FIG. 7 is a view of a catch wheel and a catch lever;

DETAILED DESCRIPTION OF THE PREFERRED EMBODIMENT

Figure 1:
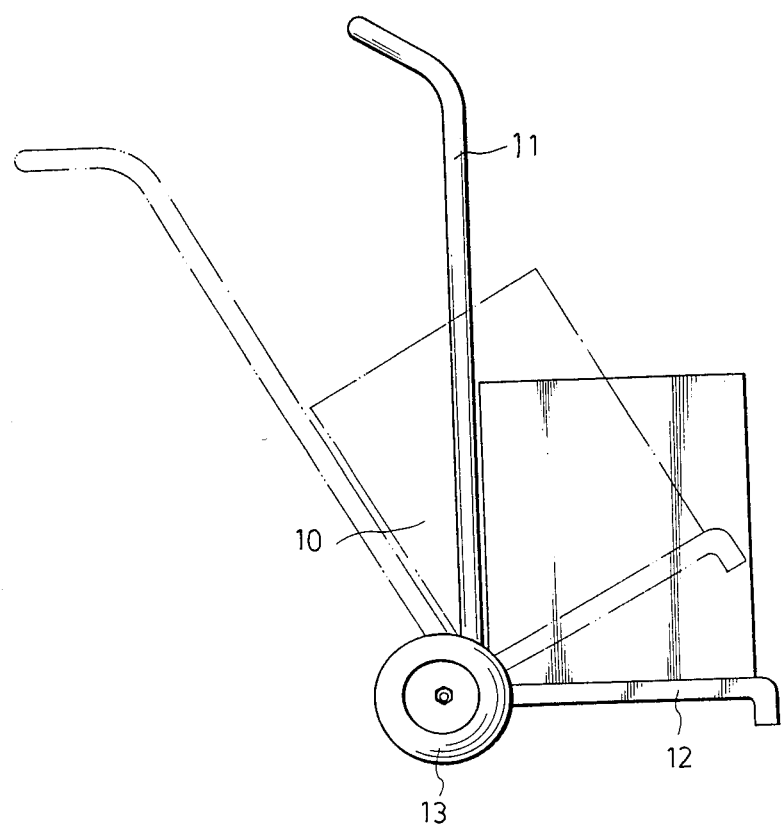
FIG. 1 is a view of a conventional barrow.
Figure 2:
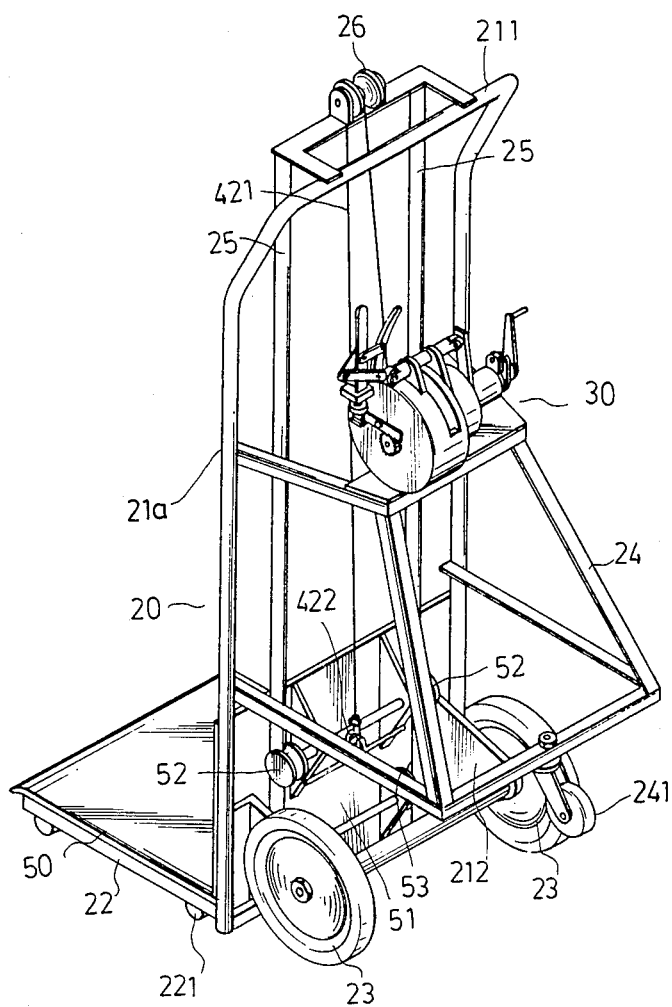
FIG. 2 is a perspective view of a truck according to the present invention.
Figure 3:
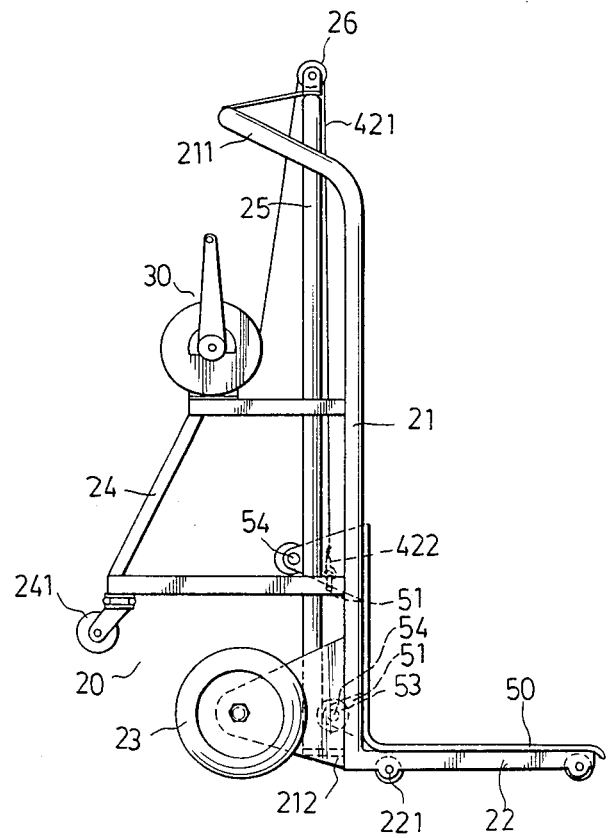
FIG. 3 is a side elevation view of the truck of FIG. 2.
Figure 4:
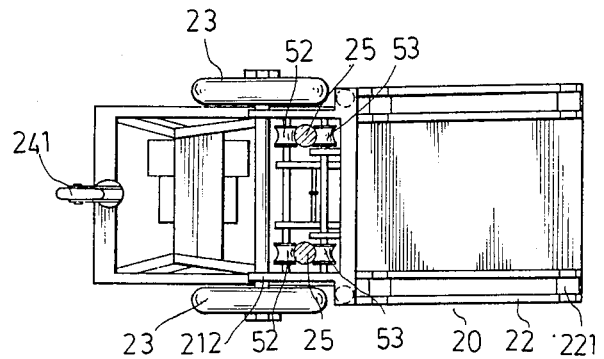
FIG. 4 is a plan view of the truck of FIG. 2.
Figure 5:
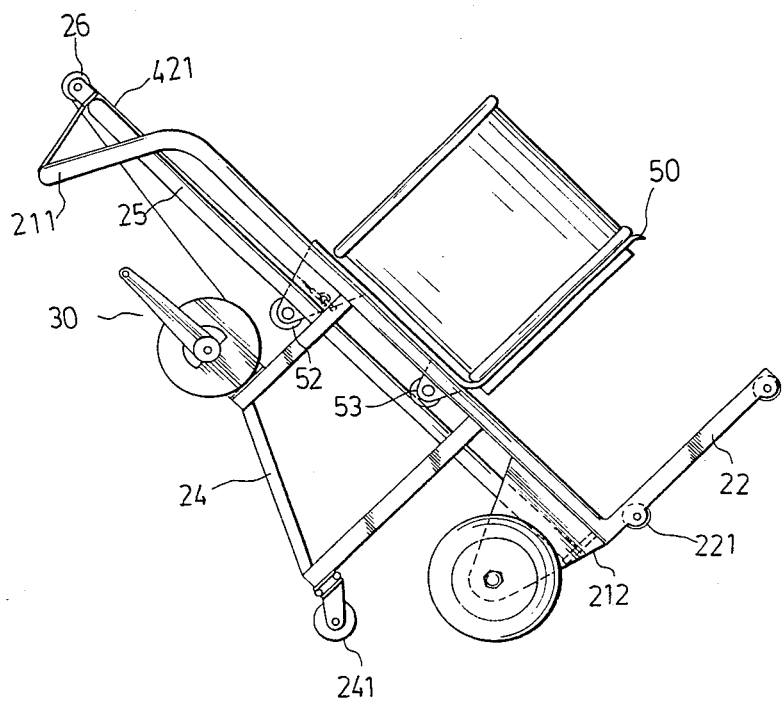
FIG. 5 is an elevation view of the truck in its inclined position.

Referring to FIGS. 2, 3, 4 and 5, a truck constructed according to the present invention is shown, having a frame 20 which includes a base portion 22 and an upstanding portion 21 extending from the rear side of the base portion 22. The upstanding portion 23 includes an upstanding bent bar 21a which has a rearwardly extending upper portion defining a U-shaped handle 211 and a pair of vertical rail bars 25 connected to the bar 21a. A rearwardly extending bracket 212 is connected to the bottom portion of the bent bar 21a and the struts 21b through a network of rods. To the bracket 212 are attached wheels 23. At the bottom of the base portion 22 are small rollers 221.

The upstanding portion 21 further has a lift device support 24 formed by a network of struts above the bracket 212. At the rear, bottom side of the support 24 is an auxiliary roller 241 which can be grounded when the base 22 and and the upstanding portion 21 are put into an inclined position. When the truck is in operation, the auxiliary roller 241 is grounded, cooperating with the wheels 23 to facilitate the driving of the truck.

On the base 22 is disposed a movable load support 50 which is in the form of a structural plate member of L-shaped cross-section. The load support 50 can be raised and lowered along the upstanding portion 21 of the frame 20 by means of a lift device 30 so as to facilitate loading and unloading operation at any height.

As shown in FIG. 6, the lift device 30 includes a reel 42 mounted in a reel casing 31, a transmission means casing 32, a brake means casing 33, a driving means 34 and a control means casing 35. The reel casing 31 includes a base plate 311 which is secured to the support 24 and a sleeve shaft 41 mounted rotatably at its center by means of bearing assemblies. Around the sleeve shaft 41 is a reel 42 with the steel rope 421 wound thereon which extends out through a semi-circular opening of the casing 31. The steel rope 421 passes over a pulley 26 which is mounted at the top of the vertical rail bars 25, and extend downward to the movable load support 50. The upstanding portion of the load support 50 is provided with, at its rear side, a pair of upper and lower brackets 51. To the brackets 51 are attached shafts 54 which carry rail rollers 52 and 53. The rail rollers 52 and 53 engage respectively with the rear and front sides of the the vertical rail bars 25 so that the load support 50 is mounted movably and firmly on the rail bars 25. The end of the steel rope 421 is connected to the load support 50 by means of a fastener 422.

Inserted in the sleeve shaft 41 is a driven shaft 43 which extends out to some extent from two ends of the sleeve shaft 41. In the transmission means casing 31 are mounted gears 321, 322, 323, 324, 325 and 326, the gear 326 being of one piece with the sleeve shaft 41, and the gear 321 being mounted on the shaft 43. Through the action of the gears, when the reel rotates due to the descending load, the rotation of the sleeve shaft 41 can be transmitted to the shaft 43 with a speed increase of several times.

Figure 8:
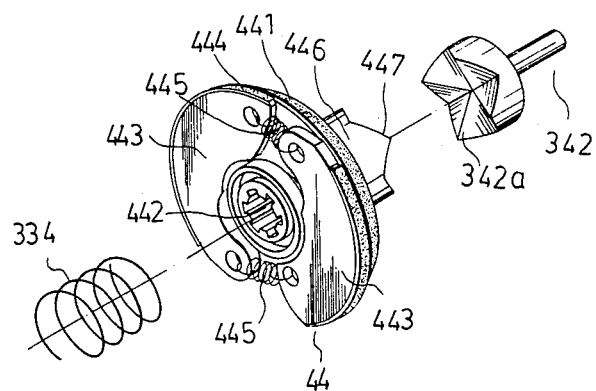
FIG. 8 is an exploded view of a clutch disc.

The brake means casing 33 is connected adjacent to the reel casing 31 opposite to the transmission means casing 31 and contains a clutch means 44 adapted to provide a brake for the reel 42 by cooperating with a catch mechanism 45 provided at the end of the shaft 43 adjacent to the transmission means casing 31. By means of this brake means, a load can be suspended at a desired height. Referring to FIG. 8 together with FIG. 6, the clutch means 44 is a circular disc having a circumferential bevel friction face 411 opposite to the inner conical friction surface 331 of the brake means casing 33, and a central bore 442 with key grooves for receiving an end portion 431 of the shaft 43 having key grooves. Two brake shoes 443 are interconnected by means of springs 445 and are connected movably to one side of the clutch disc 44, the brake shoes 443 also having clutch linings opposite to the inner friction surface of the casing 33. At the other side of the clutch disc 44 opposite the brake shoes 443 is a toothed clutch end 446 having axially extending teeth 447 of triangular shape with a tip angle of about 120 degrees.

Opposing the clutch disc 44 is a bearing seat 333, and between the clutch disc 44 and the bearing seat 333 is a spring 334 for biasing the clutch disc 44 to contact against the inner surface 331 of the casing 33. The brake means casing 33 has an end portion 33a of smaller cross-section for receiving the toothed clutch end 446. Adjacent to the toothed clutch end 446 is a corresponding toothed clutch end 342a of a driving shaft 342 which is aligned coaxially with the driven shaft 43. The toothed clutch end 342a extends into the end portion 33a of the casing 33 and engages normally with the toothed clutch end 446 by the action of the spring 334.

The catch mechanism 45 includes a toothed catch wheel 451 mounted fixedly on the driven shaft 43 at the shaft end adjacent to the transmission means casing 32 as shown in FIGS. 6 and 7. Adjacent to the toothed catch wheel 451 is a catch lever 453 having teeth 453a. The catch lever 453 is fulcrumed at the transmission means casing 32 and biassed by a spring 452 to a normally catching position relative to the toothed catch wheel 451. The catch mechanism 45 brakes the reel and the shaft 43 in its normal position.

In order to remove simultaneously the braking action of the catch mechanism 45 and the clutch disc 44, an operating means 35 is provided, which is a linkage mechanism including a vertical supporting bar 351a, a press lever 351, crank arms 352, 354, and 356, a rod 353, a push member 355 and a press member 357. The rod 353 is mounted movably on supports 353a. When the press lever 351 is pressed towards the vertical supporting bar 351a, it moves the crank arm 352 to push the rod 353 which in turn moves the arm 354 and the press member 355 to depress the clutch disc 44 against the spring 334, thereby disengaging the clutch disc 44 from the inner surface 331 of the casing 33. Simultaneously, the crank arm 356 moves the press member 357 to depress the catch lever 453, thereby releasing the catch wheel 451 from the catch lever 453.

Figure 9:
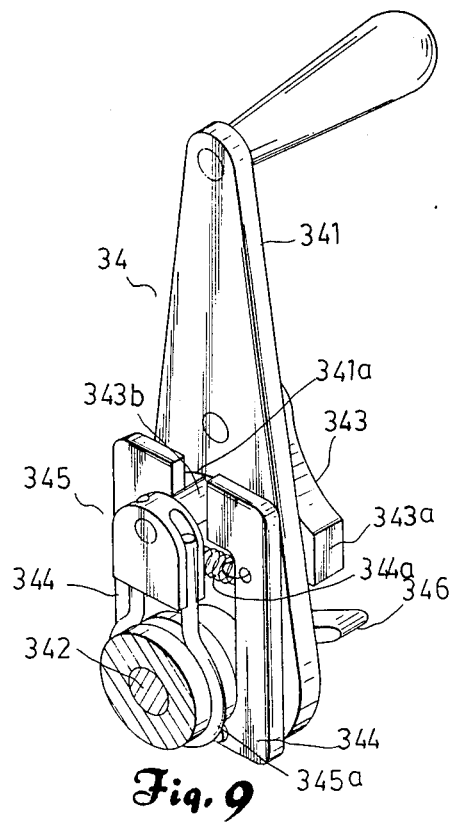
FIG. 9 is a perspective view of a hand crank plate.
Figure 10:
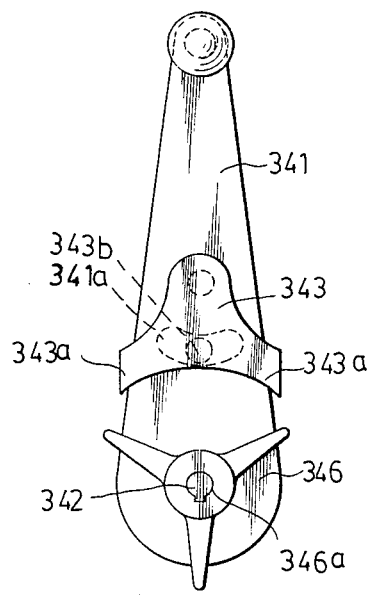
FIGS. 10, 11, 12 and 13 are schematic side elevation views of the hand crank plate.
Figure 11:
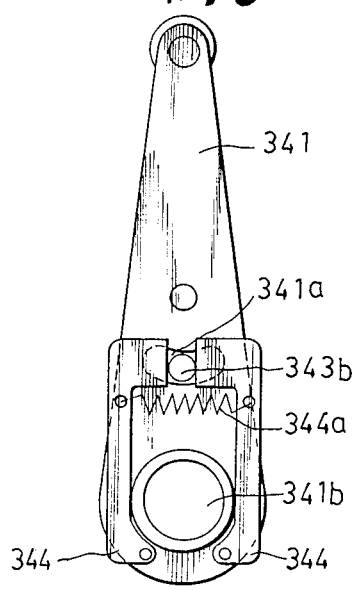

At the end of the driving shaft 342 opposite the toothed clutch end 342 are sleeved a crank plate 341 and a sprocket wheel 346. The crank plate 342 is movable relative to the shaft 342 and the sprocket wheel 346 is fixed to the shaft 342. As shown in FIGS. 9, 10, and 11, a driving plate 343 is pivoted to the crank plate 342 at a point radially offset from the shaft 342, and an arc-shaped aperture 341a is provided to receive a pin 343b of the driving plate 343. The driving plate 343 has two engaging projections 343a to engage with the teeth of the sprocket wheel 346 so as to drive the sprocket wheel 346 when the crank plate 341 is turned.

There is a circular boss 341b of the crank plate 341 at the side opposite the sprocket wheel 346. Two correction clamp arms 344 substantially in a U-shape are pivoted to the crank plate 341 on two sides of the circular boss 341b and have respectively two clamping ends for clamping the pin 343b of the driving plate 343. A spring 344a is attached to the clamp arms 344 to bias the clamping ends of the arms 344 to a clamping position so as to normally maintain the pin 343b of the driving plate 343 at the center of the aperture 341a. In this normal situation, the engaging projections 343a of the driving plate 343 are away from the teeth of the sprocket wheel 346.

Figure 12:
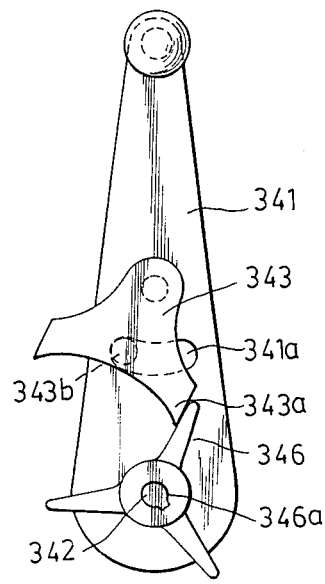
Figure 13:
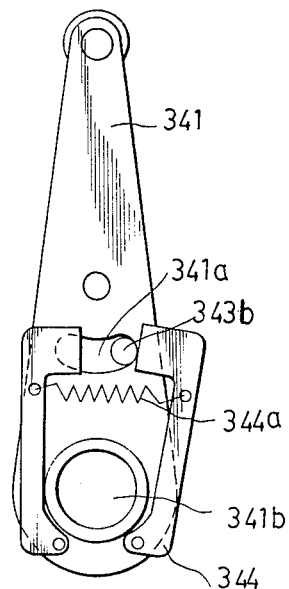

The crank plate 341 so arranged will not rotate simultaneously with the driving shaft 342 when the driving shaft 342 is rotated upon descending of the load due to the weight of the load. However, when the crank plate 341 is turned to raise the load, it can rotate the driving shaft 342 through the driving plate 343 and the sprocket wheel 346. When the crank plate 341 is turned, the driving plate 343 will turn and engage with one of the vanes of the sprocket wheel 346, as shown in FIGS. 12 and 13, causing the pin 343b to move to and engage in one end of the aperture 341a. Upon continued rotation, the sprocket wheel 346 rotates simultaneously with the crank plate 341 to drive the driving shaft 342.

Figure 14:
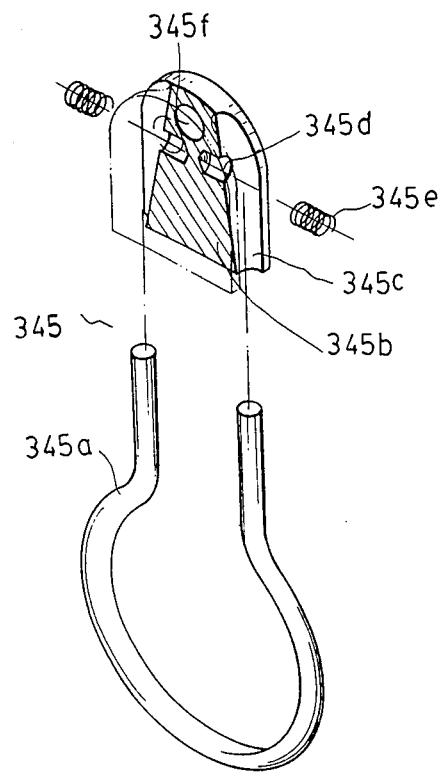
FIG. 14 is an exploded view of a resilient clamp means.

As shown in FIG. 14, there is a resilient clamp means 345 for connecting the crank plate 341 to the end portion 33a of the casing 33 in a movable position. The clamp means 345 includes a clamp spring 345a having a substantially C-shaped portion and two opposed end limbs, which is attached to a mounting plate member 345b which has two inclined grooves 345c for receiving the opposed end limbs of the spring 345a. The opposed end limbs of the spring 345a are retained in the mounting plate member 345b by its clamping action. The mounting plate member 345 is attached to the crank plate 341 by being sleeved fixedly on the pin 343b of the driving plate 343 which passes through the aperture 341a. The C-shaped portion of the spring 345a is sleeved around the end portion 33a of the brake means casing 33 and is in a clamping position holding the crank plate 341 in an immovable position at the time when the pin 343b is in its normal position in which the driving plate 343 does not engage with the sprocket wheel. When the driving plate 343 drives the sprocket wheel 346, the pin 343b will moves the mounting plate 345b which in turn causes the opposed end limbs of the spring 345a to move away slightly from one another. In this situation, the clamping pressure of the spring 345a on the end portion 33a of the casing 33 decreases and the crank plate 341 becomes movable relative to the casing 33. Springs 345e are disposed in recesses 345d of the mounting plate 345b for returning the spring 345a to its original clamping position when the operation of the crank plate 341 stops.

In lifting operation, the crank plate 341 is rotated to raise the load support 50 and the load. As the crank plate 341 rotates, the driving plate engages and drives the sprocket wheel 346 and the shaft 342. As the driving shaft 342 rotates, it first pushes the toothed clutch end 446 of the clutch disc 44 to move against the spring 334 so that the disc 44 disengages from the inner surface 331 of the casing 33. In this situation, the push member 355 which is connected to the clutch disc 44 moves together with the clutch disc 44, causing the catch lever 453 to release the toothed catch wheel 451 simultaneously with the disengaging of the clutch 44. Thereafter, the clutch disc 44 rotates concurrently with the driving shaft 342 and drives the driven shaft 43, the sleeve shaft 41, and the reel 42, causing the rope to be wound up around the reel.

As hereinabove described, the brake means is normally in the braking position. If it is desired to allow the load to descend itself by its weight, one must operate the press lever 351 to disengage the clutch disc 44 from the inner surface 331 of the brake means casing 33 and release the toothed catch wheel 451 from the catch lever 453. During the lowering operation, the brake shoes 443 serves as a control means to slow down the speed of the descending load. When the load descends, the reel rotates fast, causing the driven shaft 43 to rotate at a very high speed through the transmission gears. As the driven shaft 43 rotates so, the brake shoes 443 will be moved by centrifugal action to contact with the inner friction surface of the brake means casing 33, thereby reducing the lowering speed of the load.

With the invention thus explained, it is apparent that various modifications and variations can be made without departing from the scope of the invention. It is therefore intended that the invention be limited as indicated in the appended claims.

What I claim is:
1. A truck, comprising:
 (A) a frame having
  (i) a base movable toward and away from a generally horizontal orientation in use, said base having a rear end,
  (ii) a first upstanding portion at the rear end of said base and extending upwardly along a longitudinal direction from a lower end to an upper end of said first upstanding portion,
  (iii) two main wheels at the lower end of said first upstanding portion,
  (iv) a lift means support on said first upstanding portion and extending rearwardly thereof above said main wheels,
  (v) an auxiliary wheel mounted on said lift means support upwardly and rearwardly of said main wheels when said base is in said horizontal orientation,
  (vi) a handle portion at the upper end of said first upstanding portion, and
  (vii) vertical rail bars extending along the longitudinal direction from the rear end of said base to said handle portion;
 (B) a load support mounted on the frame for upward and downward movement along the longitudinal direction, said load support having
  (i) a second upstanding portion extending along the longitudinal direction adjacent to said rail bars, and rail rollers rollably engaging said rail bars during said upward and downward movement;
 (C) a lift means mounted on said lift means support, said lift means including
  (i) a reel having a reel axis,

(ii) a reel casing mounted on said lift means support for encasing said reel, (iii) a hollow sleeve shaft journaled in said reel casing for joint rotation with the reel about the reel axis, (iv) a rope wound about the reel axis about said reel and having one end connected to said load support for moving the same, (v) a driven shaft mounted within, and extending along the reel axis through, said hollow sleeve shaft, said driven shaft having opposite end portions extending axially outwardly beyond opposite ends of said hollow sleeve shaft, and being rotatable about the reel axis, and (vi) a transmission means operatively connected between said driven shaft and said hollow sleeve shaft, said transmission means including a transmission casing mounted axially adjacent one side of said reel casing, and a set of meshing gears within the transmission casing, and operative for transmitting the rotation of said driven shaft to said sleeve shaft at a reduced speed, one of said gears being fixedly mounted on one of the opposite end portions of said driven shaft, and another one of said gears being fixedly mounted to said hollow sleeve shaft; and (D) a first operating means for rotating said reel and paying out said rope, said first operating means including (i) a driving shaft extending coaxially with said driven shaft and having a first toothed clutch end adjacent to said driven shaft, and (ii) hand crank plate connected to said driving shaft.

2. A truck as claimed in claim 1, wherein said base has small rollers at a bottom side of said base.

3. A truck as claimed in claim 1, further including a pulley means mounted at a top side of said first upstanding portion, over which said rope is passed.

4. A truck as claimed in claim 1, wherein said lift means further includes a brake means which comprises: a brake casing mounted adjacent to the other side of said reel casing opposite to said transmission casing; a clutch disc mounted in an axially movable position on said driven shaft adjacent to said first toothed clutch end and having a second toothed clutch end axially projecting from a central portion of said clutch disc for engaging with said first toothed clutch end; a spring member attached to said driven shaft and biasing said clutch disc to cause said second toothed clutch end to engage with said first toothed cluth end; and a second operating means for disengaging said second toothed clutch end from said first toothed clutch end.

5. A truck as claimed in claim 4, wherein said first and second toothed clutch ends have respectively axially extending clutch teeth of triangular crosssection.

6. A truck as claimed in claim 5, wherein said brake casing has an inner conical friction surface, and said clutch disc further includes a bevel lining to contact with said inner surface of said brake casing, said bevel lining engaging said inner surface of said brake casing by the action of said member and disengaging therefrom upon the operation of said second operating means.

7. A truck as claimed in claim 6, wherein said brake means further includes two brake shoes connected movably to said clutch disc.

8. A truck as claimed in claim 7, wherein said brake means further includes a toothed catch wheel mounted on the end portion of said driven shaft adjacent to said transmission casing, a catch lever fulcrumed at said trnasmission casing adjacent to said toothed catch wheel, and a resilient means biasing said catch lever to engage with said toothed catch wheel, said catch lever being disengaged from said toothed catch wheel by the operation of said second operating means.

9. A truck as claimed in claim 8, wherein said second operating means includes a press lever handle and a crank mechanism connected to said catch lever and said clutch disc.

10. A truck as claimed in claim 9, in which said first toothed clutch end of said driving shaft extends into said brake means casing, wherein said brake means casing has an end portion of smaller cross-section for receiving said first and second toothed clutch ends, said second operating means further including a resilient clamping means connected to said hand crank plate and clamping said end portion of said brake casing in a movable position.

11. A truck as claimed in claim 10, wherein said first operating means further has a sprocket wheel affixed to the end portion of said driving shaft opposite to said first toothed clutch end, said hand crank plate being movable relative to said driving shaft and including a driving means attached thereto for engaging and driving said sprocket wheel when said hand crank plate is operated.

12. A truck as claimed in claim 11, wherein said driving means includes a driving plate pivoted to said hand crank plate at a pivot point radially offset from said driving shaft, said hand crank plate having an aperture of arc shape between said pivot point and said driving shaft, said driving plate having a pin passing through said aperture and an engaging portion capable of engaging with said sprocket wheel when said hand crank plate is operated, said driving means further having a correction clamp means attached to said hand crank plate at the side opposite to said driving plate and clamping resiliently said pin to maintain said driving plate in a non-engaging relationship with said sprocket wheel.

13. A truck as claimed in claim 12, wherein said correction clamp means includes two bent arms which are pivoted to said hand crank plate and which have respectively clamping ends normally biassed to approach one another to clamp said pin.

14. A truck as claimed in claim 13, wherein said second operating means further includes a resilient clamp means to connect movably said hand crank plate to said smaller cross-section end portion of said brake means casing.

* * * * *